United States Patent [19]

Pohl

[11] Patent Number: 5,262,059
[45] Date of Patent: Nov. 16, 1993

[54] METHOD OF REMOVING ORGANIC CONTAMINANTS FROM WATER

[75] Inventor: Neil W. Pohl, New Richmond, Wis.

[73] Assignee: Cal-Sine Environmental, Inc., New Richmond, Wis.

[21] Appl. No.: 990,441

[22] Filed: Dec. 15, 1992

[51] Int. Cl.$^5$ .............................................. B01D 15/00
[52] U.S. Cl. ..................................... 210/691; 210/751; 210/925
[58] Field of Search ............... 210/751, 679, 925, 691, 210/799

[56] References Cited

U.S. PATENT DOCUMENTS

| | | | |
|---|---|---|---|
| 3,198,731 | 8/1965 | De Lew | 210/751 |
| 4,178,265 | 12/1979 | Matsuda et al. | 210/925 |
| 5,030,591 | 7/1991 | Cole et al. | 210/679 |

*Primary Examiner*—Stanley S. Silverman
*Assistant Examiner*—Cynthia L. Nessler
*Attorney, Agent, or Firm*—Ryan, Kees & Hohenfeldt

[57] ABSTRACT

A process for removing an organic contaminant from a body of water containing an undesired liquid organic contaminant such as an oil or an organic solvent, that includes the steps of depositing a particulate, water insoluble calcium, magnesium, or aluminum salt of an organic acid having between 10 and 22 carbon atoms in the water, maintaining the particulate material in contact with the contaminant for a time effective for the contaminant to become bound to the particulate material. The particulate material and the contaminant are then removed from the water. The preferred insoluble salt is calcium stearate.

4 Claims, No Drawings

METHOD OF REMOVING ORGANIC CONTAMINANTS FROM WATER

FIELD OF THE INVENTION

This invention relates to clean-up of water. More particularly the invention relates to processes for removal of volatile and/or oily liquid organic contaminants from bodies of water.

BACKGROUND OF THE INVENTION

Various processes and materials have been suggested for removal of oil spills and other liquid organic materials from the surfaces of the bodies of water which have become contaminated by leaks or spills. For example, skimming techniques and containment booms have been employed for that purpose. Also various absorbing materials such as sawdust or other solid absorbent materials have been tested. There remains, however, a need for improved materials and processes for removal of oily or volatile organic contaminants from bodies of water.

SUMMARY OF THE INVENTION

It is an object of the present invention to provide improved processes for removal of a variety of organic contaminants from water. An important aspect of the invention relates to providing new materials that have the ability to absorb, adsorb or otherwise combine with organic contaminants and thereby remove them from water. A related aspect is to provide such materials that in themselves insoluble in water and which therefore after mixing with water can readily be separated therefrom. A further related aspect of the invention relates to providing such materials that are lighter or less dense than water and thus can be readily removed from the surface thereof.

Briefly summarized, the invention provides a process for removing an organic contaminant from a body of water containing an undesired liquid organic contaminant such as an oil or an organic solvent, that includes the steps of depositing a particulate, water insoluble calcium, magnesium, or aluminum salt of an organic acid having between 10 and 22 carbon atoms in the water, maintaining the particulate material in contact with the contaminant for a time effective for the contaminant to become bound to the particulate material. The particulate material and the contaminant are then removed from the water. The preferred particulate material is calcium stearate.

Specific illustrations of the practice of the invention are set forth in the following examples. All parts are given by weight unless otherwise indicated.

EXAMPLE 1

Fresh tap water and sea water were placed in one gallon containers. A visible slick of motor oil was placed on each container of water and could be observed floating on the water. The surface of the water was then sprinkled with a layer of calcium stearate having a particle size and consistency similar to dry granular laundry detergent. After thorough mixing it was noted that the calcium stearate mixed with the oil producing a solid substance that floated on the surface of the water. This substance was removed with a shop wet vacuum. The substance was water repellent and did not retain any water. Both the fresh water and the salt water were observed to be free of oil and free of any sheen on the surface thereof.

EXAMPLE 2

Example 1 was repeated substituting the following organic contaminants for the oil: methylisobutyl ketone, methylethyl ketone, mineral spirits, rubbing alcohol, benzene, neosol, xylene, commercial paint thinner, diesel fuel (number 1 and number 2), kerosene, gasoline, gasoline mixed with oil, spent motor oil, and wood preservative (Milltreat F). In each case calcium stearate was sprinkled on the floating contaminant. It was observed that all of the visible organic contaminant liquid was effectively removed from the top of the water. In the case of the experiment with gasoline, after removal of the gasoline by the stearate, a match was held over the water with no ignition observed. One drop of gasoline was then added to the water. A flash was observed to when a match was again struck over the mixture.

Applications of the present invention include clean-up of occurrences such as petroleum pipeline ruptures, leakage from offshore oil wells, oil tanker spills, or chemical spills resulting from train derailments or tanker truck accidents where the containment flows into a body of water.

While calcium stearate is the preferred clean-up material, it will be appreciated that other similar salts can be substituted. For example, a mixture of calcium stearate, calcium palmatate, and calcium oleate, derived from a soap can be used. Magnesium or aluminum stearate, palmitate or oleate can also be substituted. Other salts having between 10 and 22 carbon atoms can also be substituted.

What is claimed is:

1. A process for removing an organic contaminant from a body of water comprising:
    selecting a body of water containing an undesired liquid organic contaminant,
    depositing a dry, solid, particulate, water insoluble calcium, magnesium, or aluminum salt of an organic acid having between 10 and 22 carbon atoms in said water,
    maintaining said particulate salt in contact with said contaminant for a time effective for said contaminant to become bound to said particulate salt,
    removing said particulate salt and said contaminant from said water.

2. A process according to claim 1 wherein said particulate salt comprises calcium stearate.

3. A process according to claim 1 wherein said contaminant comprises an oil.

4. A process for removing a liquid or organic contaminant from a body of water comprising:
    selecting a body of water containing an undesired liquid organic contaminant floating on the surface thereof,
    mixing dry, solid, particulate calcium stearate with said water,
    maintaining said calcium stearate in contact with said contaminant for a time effective for said contaminant to become bound thereto
    removing said calcium stearate and said contaminant from said water.

* * * * *